(12) United States Patent
Oh et al.

(10) Patent No.: US 11,586,715 B1
(45) Date of Patent: Feb. 21, 2023

(54) ELECTRONIC APPARATUS FOR PROVIDING INFORMATION BASED ON EXISTENCE OF A USER ACCOUNT AND METHOD THEREOF

(71) Applicant: Coupang Corp., Seoul (KR)

(72) Inventors: Hye Jin Oh, Seoul (KR); Yeo Joo Yang, Seoul (KR); Seon Il Kim, Seoul (KR); Hae Yeon Lee, Seoul (KR); Hyun Hee Ahn, Seoul (KR); Jung Yeon Nam, Seoul (KR); Ji Won Ahn, Seoul (KR); Kun Soo Han, Seoul (KR); Tae Jun Lee, Seoul (KR); Hye Sung Ma, Seoul (KR); Ju Young Park, Seoul (KR); Sang Gi Hong, Seoul (KR); Yan Yan Chen, Seoul (KR); Yun Gao, Seoul (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/565,250

(22) Filed: Dec. 29, 2021

(30) Foreign Application Priority Data

Jul. 30, 2021 (KR) .......................... 10-2021-0101001

(51) Int. Cl.
*G06F 21/31* (2013.01)
(52) U.S. Cl.
CPC .................................... *G06F 21/31* (2013.01)
(58) Field of Classification Search
CPC ....................................................... G06F 21/31
See application file for complete search history.

(56) References Cited

U.S. PATENT DOCUMENTS

| 5,992,737 | A  | * | 11/1999 | Kubota | G06F 16/90344 |
| | | | | | 707/999.1 |
| 6,662,342 | B1 | * | 12/2003 | Marcy | G06F 40/143 |
| | | | | | 715/234 |
| 8,108,316 | B1 | * | 1/2012 | Shapiro | G06Q 20/227 |
| | | | | | 705/64 |
| 9,203,829 | B1 | * | 12/2015 | Levine | G06F 21/41 |
| 9,350,599 | B1 | * | 5/2016 | Enright | H04L 63/20 |
| 9,507,851 | B1 | * | 11/2016 | Marquie | G06F 16/3326 |
| 9,559,995 | B1 | * | 1/2017 | Wong | H04L 51/046 |

(Continued)

FOREIGN PATENT DOCUMENTS

| JP | 2003-187192 A | 7/2003 |
| KR | 10-2012-0001175 A | 1/2012 |

(Continued)

OTHER PUBLICATIONS

Oct. 25, 2021—Office Action in KR App 10-2021-0101001.

*Primary Examiner* — Aravind K Moorthy
(74) *Attorney, Agent, or Firm* — Banner & Witcoff, Ltd.

(57) ABSTRACT

Disclosed is a method of providing information including obtaining input information of a user, wherein the input information is related to a service, determining whether an account corresponding to the user exists in the service, obtaining characteristic information of the user based on the result of the determination, providing response information corresponding to the input information based on the characteristic information and the result of the determination, and storing activity information of the user based on at least one of the input information, the response information, and the characteristic information.

16 Claims, 11 Drawing Sheets

(56) References Cited

U.S. PATENT DOCUMENTS

| | | | |
|---|---|---|---|
| 9,560,214 B1* | 1/2017 | Phillip | H04W 4/24 |
| 9,965,746 B1* | 5/2018 | Keiser | G06Q 10/109 |
| 10,424,170 B1* | 9/2019 | Benkreira | G07F 19/204 |
| 10,504,504 B1* | 12/2019 | Meltzner | G10L 25/27 |
| 10,721,226 B1* | 7/2020 | Kurani | H04L 63/083 |
| 10,873,578 B1* | 12/2020 | Rose | H04L 9/3226 |
| 10,943,063 B1* | 3/2021 | Mccown | G06F 21/31 |
| 11,204,682 B1* | 12/2021 | Hall | G06Q 50/30 |
| 11,245,592 B1* | 2/2022 | Thomson | H04L 41/145 |
| 11,250,039 B1* | 2/2022 | Chang | G06F 16/90324 |
| 11,269,756 B1* | 3/2022 | Hristu | G06F 11/3612 |
| 11,295,504 B1* | 4/2022 | Allen, Jr. | G06T 11/60 |
| 11,321,077 B1* | 5/2022 | Sakthikumar | G06F 21/572 |
| 2002/0188694 A1* | 12/2002 | Yu | G06F 16/9535 715/206 |
| 2004/0010606 A1* | 1/2004 | Delaney | G06F 21/31 709/204 |
| 2004/0010791 A1* | 1/2004 | Jain | G06F 9/542 719/318 |
| 2005/0075895 A1* | 4/2005 | Mohsenin | H04N 21/2743 726/28 |
| 2006/0224583 A1 | 10/2006 | Fikes et al. | |
| 2008/0005381 A1* | 1/2008 | Theocharous | G06F 1/3203 710/18 |
| 2008/0082421 A1* | 4/2008 | Onyon | G06Q 30/0207 705/14.1 |
| 2009/0083230 A1* | 3/2009 | Watanabe | G06F 16/3338 |
| 2009/0163175 A1* | 6/2009 | Shi | H04W 12/069 455/411 |
| 2009/0265460 A1* | 10/2009 | Balasubramanian | H04L 43/00 709/224 |
| 2009/0290587 A1* | 11/2009 | Kobayashi | H04J 3/1617 370/395.1 |
| 2009/0293108 A1* | 11/2009 | Weeden | G06F 21/41 726/6 |
| 2009/0327010 A1* | 12/2009 | Vadhri | G06Q 40/00 705/35 |
| 2010/0250929 A1* | 9/2010 | Schultz | H04L 63/083 713/168 |
| 2010/0268776 A1* | 10/2010 | Gerke | G06Q 10/10 709/204 |
| 2011/0099245 A1* | 4/2011 | Singh | G06F 11/3438 707/E17.014 |
| 2011/0296530 A1* | 12/2011 | Tsai | G06F 21/84 713/320 |
| 2012/0311684 A1* | 12/2012 | Paulsen | H04L 63/1425 726/6 |
| 2013/0031006 A1* | 1/2013 | McCullagh | G06Q 20/36 705/66 |
| 2013/0117254 A1* | 5/2013 | Manuel-Devadoss | G06F 16/9535 707/709 |
| 2013/0167196 A1* | 6/2013 | Spencer | H04L 67/303 370/254 |
| 2013/0227016 A1* | 8/2013 | Risher | G06F 16/248 709/204 |
| 2014/0095412 A1* | 4/2014 | Agashe | G06N 20/00 706/46 |
| 2014/0165178 A1* | 6/2014 | Perrone, II | H04L 63/0892 726/5 |
| 2014/0193794 A1* | 7/2014 | Olander, III | G09B 7/06 434/362 |
| 2014/0196075 A1* | 7/2014 | Park | H04N 21/43615 725/30 |
| 2014/0215573 A1* | 7/2014 | Cepuran | G06F 21/6218 726/4 |
| 2014/0278730 A1* | 9/2014 | Mu | G06Q 10/0635 705/7.28 |
| 2014/0280123 A1* | 9/2014 | Bank | G06F 16/24578 707/734 |
| 2014/0282884 A1* | 9/2014 | Bao | G06F 21/316 726/4 |
| 2015/0026675 A1* | 1/2015 | Csaszar | H04L 67/10 717/178 |
| 2015/0033029 A1* | 1/2015 | Nakajima | H04L 9/3226 713/184 |
| 2015/0095754 A1* | 4/2015 | Zhang | G06F 40/232 715/226 |
| 2015/0113381 A1* | 4/2015 | Fu | H04W 4/18 715/234 |
| 2015/0180894 A1* | 6/2015 | Sadovs | G06F 3/0481 726/22 |
| 2015/0215304 A1 | 7/2015 | Cao | |
| 2015/0227714 A1* | 8/2015 | Hayakawa | G16H 10/60 705/3 |
| 2015/0237037 A1* | 8/2015 | Staker | H04L 63/101 726/4 |
| 2016/0005133 A1* | 1/2016 | Flynn | G06Q 50/01 705/319 |
| 2016/0140561 A1* | 5/2016 | Cowan | G06Q 20/4016 705/26.35 |
| 2016/0342694 A1* | 11/2016 | Allen | H04L 67/306 |
| 2016/0371798 A1* | 12/2016 | Ghahramani | G06Q 10/025 |
| 2017/0093828 A1* | 3/2017 | Lupien | H04L 67/02 |
| 2017/0099395 A1* | 4/2017 | Lu | H04M 17/208 |
| 2017/0103400 A1* | 4/2017 | Agarwal | G06Q 30/016 |
| 2017/0286414 A1* | 10/2017 | Roebuck | G06V 30/416 |
| 2017/0289168 A1* | 10/2017 | Bar | G06F 21/316 |
| 2017/0339092 A1* | 11/2017 | Saxena | H04L 67/306 |
| 2018/0191806 A1* | 7/2018 | Ambar | H04L 67/1004 |
| 2018/0211256 A1* | 7/2018 | Anson | G06Q 20/4014 |
| 2018/0349606 A1* | 12/2018 | Zhang | G06F 21/577 |
| 2019/0095320 A1* | 3/2019 | Biswas | G06F 21/577 |
| 2019/0266196 A1* | 8/2019 | Boyce | G06N 20/00 |
| 2019/0325445 A1 | 10/2019 | Anderson et al. | |
| 2020/0034803 A1* | 1/2020 | Bourgeois | G06Q 20/387 |
| 2020/0092165 A1* | 3/2020 | Sellers | H04L 63/1491 |
| 2020/0150831 A1* | 5/2020 | Chauhan | G06F 3/0482 |
| 2020/0314105 A1* | 10/2020 | Guo | H04L 63/102 |
| 2020/0320187 A1* | 10/2020 | Ide | G06F 21/45 |
| 2020/0380410 A1* | 12/2020 | Drutsa | G06N 20/00 |
| 2021/0027291 A1* | 1/2021 | Ranganathan | G06F 9/451 |
| 2021/0133304 A1* | 5/2021 | Larson | H04L 63/08 |
| 2021/0174318 A1* | 6/2021 | Kaidi | G06Q 20/10 |
| 2021/0203661 A1* | 7/2021 | Sankey | G06Q 30/0185 |
| 2021/0224823 A1* | 7/2021 | Oomori | G06Q 30/0185 |
| 2021/0306461 A1* | 9/2021 | Scott | H04M 3/42068 |
| 2021/0336912 A1* | 10/2021 | Ahn | H04N 7/15 |
| 2021/0358026 A1* | 11/2021 | Phillips | G06Q 20/04 |
| 2021/0374758 A1* | 12/2021 | Hochma | G06F 40/284 |
| 2021/0406896 A1* | 12/2021 | Chaturvedi | G06Q 20/102 |
| 2022/0046012 A1* | 2/2022 | Neagle | H04L 63/0861 |
| 2022/0060463 A1* | 2/2022 | Zhang | H04L 63/0884 |
| 2022/0067700 A1* | 3/2022 | Hallaq | G06Q 20/348 |
| 2022/0094752 A1* | 3/2022 | Papernik | H04L 67/306 |
| 2022/0114664 A1* | 4/2022 | Curtis | G06N 20/00 |
| 2022/0215333 A1* | 7/2022 | Chiang | G06F 9/547 |
| 2022/0230138 A1* | 7/2022 | Baek | G06Q 10/101 |

FOREIGN PATENT DOCUMENTS

| | | |
|---|---|---|
| KR | 101136686 B1 | 4/2012 |
| KR | 101284875 B1 | 7/2013 |
| KR | 1020160010791 A | 1/2016 |
| KR | 101632121 B1 | 6/2016 |
| KR | 1020180047489 A | 5/2018 |
| KR | 10-2018-0109030 A | 10/2018 |
| KR | 101904208 B1 | 10/2018 |
| KR | 1020190079092 A | 7/2019 |
| KR | 102129371 B1 | 7/2020 |
| TW | I635412 B | 9/2018 |
| WO | 2008064065 A1 | 5/2008 |
| WO | 2015-023306 A1 | 2/2015 |

\* cited by examiner

FIG. 5
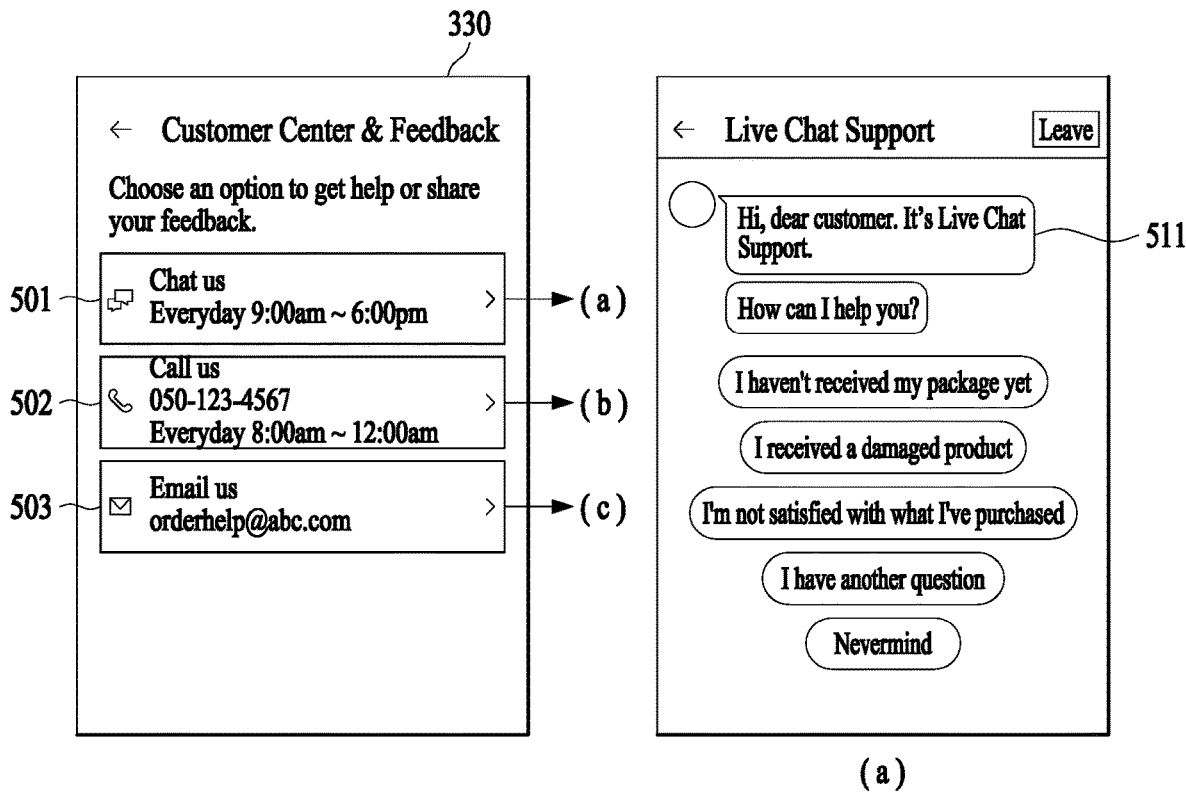
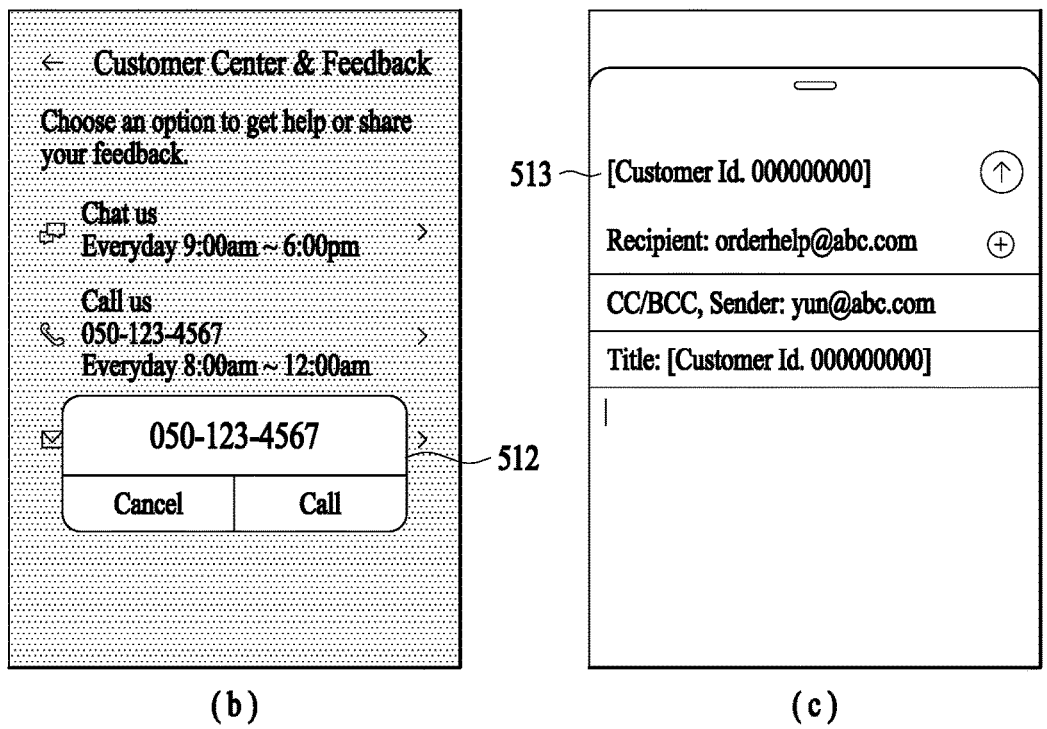

ELECTRONIC APPARATUS FOR PROVIDING INFORMATION BASED ON EXISTENCE OF A USER ACCOUNT AND METHOD THEREOF

RELATED APPLICATION INFORMATION

The present application claims priority to and the benefit of Korean Patent Application No. 10-2021-0101001, filed on Jul. 30, 2021, and is incorporated by reference herein in its entirety.

Technical Field

The present disclosure relates to an electronic apparatus and method for providing information based on whether a user account exists. More particularly, the present disclosure relates to a method of determining whether an account corresponding to a user exists, obtaining characteristic information of the user based on the result of the determination, and providing response information to the user based on the characteristic information and the result of the determination, and an electronic apparatus using the same.

Description of the Related Art

As the Internet is commonly used, Internet-based services are being provided in various fields including an electronic commerce market. In particular, with the spread of infectious diseases, interest and demand for Internet-based services that may handle customer needs in a non-face-to-face manner have a rapidly increasing trend.

An Internet-based service provider may provide customized services to each customer using the Internet-based service by identifying areas of interest, inclinations, or the like of the customer, which may be obtained as the customer performs various activities (including search queries, clicks on advertisements, adding items to a shopping cart, purchasing items, and other browsing activities that reflect user preferences and interests). Accordingly, the customer may quickly and conveniently receive his or her desired service. In addition, the customer may wish to look at his or her past activity history. Accordingly, it is necessary to organize and store past activities of a user.

Here, in order to organize and store the user activities, it is important to determine the user who has performed each of the user activities, and when this is determined only based on whether the user is logged-in, the activities performed while not logged-in or the activities performed before an account is created are not determined as past activities of the user, and thus the past activity history of the user may not be fully taken into consideration.

In this regard, reference may be made to prior art documents, such as KR101284875B1 or KR101136686B1.

DISCLOSURE OF THE INVENTION

Technical Goals

An aspect provides an electronic apparatus and a method thereof, which obtain input information of a user, wherein the input information is related to a service, determine whether an account corresponding to the user exists in the service, obtain characteristic information of the user based on the result of the determination, provide response information corresponding to the input information based on the characteristic information and the result of the determination, and store activity information of the user based on at least one of the input information, the response information, and the characteristic information.

However, the goals to be achieved by example embodiments of the present disclosure are not limited to the objectives described above and other objects may be inferred from the following example embodiments.

Technical Solutions

According to an aspect of the present disclosure, there is provided a method of providing information by an electronic apparatus, the method including obtaining input information of a user, wherein the input information is related to a service, determining whether an account corresponding to the user exists in the service, obtaining characteristic information of the user based on the result of the determination, providing response information corresponding to the input information based on the characteristic information and the result of the determination, and storing activity information of the user based on at least one of the input information, the response information, and the characteristic information.

According to an example embodiment, the determining of whether the account exists may include determining an account used in logged-in as the account corresponding to the user, when the user is in a logged-in state, and determining whether the account corresponding to the user exists based on one or more pieces of information for specifying the user, when the user is not in a logged-in state.

According to an example embodiment, the one or more pieces of information may include information related to a terminal used by the user.

According to an example embodiment, the information related to the terminal may include at least one of a phone number corresponding to the terminal, unique identifier information of the terminal, and user information registered to correspond to the terminal.

According to an example embodiment, the obtaining of the characteristic information may include obtaining the characteristic information based on account information used in the logged-in when the user is in a logged-in state, and obtaining the characteristic information based on at least one of the one or more pieces of information, when the user is not in a logged-in state.

According to an example embodiment, the providing of the response information may include obtaining activity history information of the user based on the characteristic information of the user, and providing the response information based on the activity history information.

According to an example embodiment, the storing of the activity information of the user may include updating activity history information of the user to include the activity information of the user.

According to an example embodiment, the method may further include receiving an account creation request of the user, providing an account creation page in response to the account creation request in the case in which an account for the user is allowed to be created, and linking the activity information to the account corresponding to the user when the account corresponding to the user is created based on the user information input through the account creation page.

According to an example embodiment, a one-byte character included in the information input by the user to create the account may be converted into a two-byte character and processed in the process of creating the account of the user.

According to an example embodiment, the providing of the account creation page may include transmitting a code for verification to a phone number corresponding to the user, receiving an input from the user, and verifying whether the input corresponds to the code for the verification.

According to an example embodiment, the method may further include receiving an input related to non-receipt of a code for verification from the user, providing information indicating that an interface for requesting retransmission of a code for verification is not activated when a first preset time has not passed since the code for verification was previously transmitted to a phone number corresponding to the user, and activating the interface for requesting retransmission of a code for verification when the first preset time has passed since the code for verification was previously transmitted to the phone number corresponding to the user.

According to an example embodiment, the first preset time may be determined in consideration of a communication service situation of a country to which the user belongs.

According to an example embodiment, the method may further include providing a screen for requesting a response of the user when there is no response from the user for a second preset time. The screen for requesting a response of the user may include at least one of information for requesting confirmation of a phone number and information for requesting an input of a received code.

According to an example embodiment, the method may further include receiving an account deletion request of the user, providing an account deletion page in response to the account deletion request in a case in which an account for the user is allowed to be deleted, and releasing a link between the activity information and the account corresponding to the user when the account corresponding to the user is deleted based on user information input through the account deletion page.

According to an example embodiment, the method may further include determining benefit information provided to the user based on the activity information of the user and activity history information of the user.

According to another aspect of the present disclosure, there is provided an electronic apparatus configured to provide information, including a transceiver, a memory configured to store instructions, and a processor. The processor is connected to the transceiver and the memory, and configured to obtain input information of a user, wherein the input information is related to a service, determine whether an account corresponding to a user exists in the service, obtain characteristic information of the user based on the result of the determination, provide response information corresponding to the input information based on the characteristic information and the result of the determination, and store activity information of the user based on at least one of the input information, the response information, and the characteristic information, and the activity information is stored in the memory.

Details of other example embodiments are included in the following detailed description and the accompanying drawings.

Effects

According to the present disclosure, an electronic apparatus and method for processing information provide response information to a user by reflecting whether an account of the user exists and obtains user activity information based on whether the account of the user exists so that activity history information of a specific user can include an activity history when an account corresponding to the corresponding user did not exist, an activity history while not logged-in after the corresponding user has created the account, and an activity history while the corresponding user has created the account and logged-in, thereby allowing the activity history information of the user to fully reflect the corresponding user's activity.

Effects of the present disclosure are not limited to those described above and other effects may be made apparent to those skilled in the art from the following description.

BRIEF DESCRIPTION OF THE DRAWINGS

FIG. 5 is a view for illustratively describing a method of providing response information according to an example embodiment.

DETAILED DESCRIPTION FOR CARRYING OUT THE INVENTION

Figure 1:
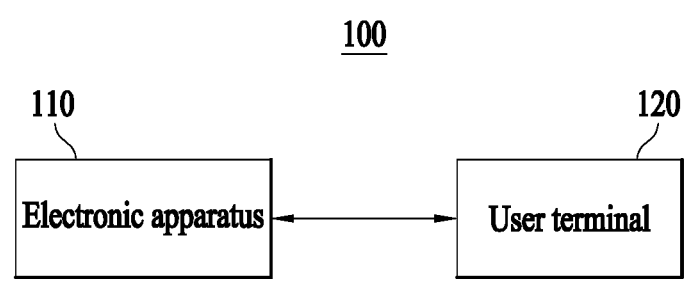
FIG. 1 is a schematic configuration diagram illustrating a system for providing information according to an example embodiment.

Terms used in the example embodiments are selected, as much as possible, from general terms that are widely used at present while taking into consideration the functions obtained in accordance with the present disclosure, but these terms may be replaced by other terms based on intentions of those skilled in the art, customs, emergence of new technologies, or the like. Also, in a particular case, terms that are arbitrarily selected by the applicant of the present disclosure may be used. In this case, the meanings of these terms may be described in corresponding description parts of the disclosure. Accordingly, it should be noted that the terms used herein should be construed based on practical meanings thereof and the whole content of this specification, rather than being simply construed based on names of the terms.

In the entire specification, when an element is referred to as "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software.

The expression "at least one of A, B, and C" may indicate the following meaning including: A alone; B alone; C alone; both A and B together; both A and C together; both B and C together; or all three of A, B, and C together.

In the present disclosure, a "terminal" may be implemented as a computer or a portable terminal capable of accessing a server or another terminal through a network. Here, the computer may include, for example, a laptop computer, a desktop computer, and a notebook equipped with a web browser. The portable terminal may be a wireless communication device ensuring a portability and a mobility, and include any type of handheld wireless communication device, for example, a tablet PC, a smartphone, a communication-based terminal such as international mobile telecommunication (IMT), code division multiple access (CDMA), W-code division multiple access (W-CDMA), and long term evolution (LTE).

In the following description, example embodiments of the present disclosure will be described in detail with reference to the drawings so that those skilled in the art can easily carry out the present disclosure. The present disclosure may be embodied in many different forms and is not limited to the embodiments described herein.

Hereinafter, example embodiments of the present disclosure will be described with reference to the drawings.

In describing the example embodiments, descriptions of technical contents that are well known in the art to which the present disclosure belongs and are not directly related to the present specification will be omitted. This is to more clearly communicate without obscure the subject matter of the present specification by omitting unnecessary description.

For the same reason, in the accompanying drawings, some components are exaggerated, omitted or schematically illustrated. In addition, the size of each component does not fully reflect the actual size. The same or corresponding components in each drawing are given the same reference numerals.

Advantages and features of the present disclosure and methods of achieving them will be apparent from the following example embodiments that will be described in more detail with reference to the accompanying drawings. It should be noted, however, that the present disclosure is not limited to the following example embodiments, and may be implemented in various forms. Accordingly, the example embodiments are provided only to disclose the present disclosure and let those skilled in the art know the category of the present disclosure. In the drawings, embodiments of the present disclosure are not limited to the specific examples provided herein and are exaggerated for clarity. The same reference numerals or the same reference designators denote the same elements throughout the specification.

At this point, it will be understood that each block of the flowchart illustrations and combinations of flowchart illustrations may be performed by computer program instructions. Since these computer program instructions may be mounted on a processor of a general purpose computer, special purpose computer, or other programmable data processing equipment, those instructions executed through the computer or the processor of other programmable data processing equipment may create a means to perform the functions be described in flowchart block(s). These computer program instructions may be stored in a computer usable or computer readable memory that can be directed to a computer or other programmable data processing equipment to implement functionality in a particular manner, and thus the computer usable or computer readable memory. It is also possible for the instructions stored in to produce an article of manufacture containing instruction means for performing the functions described in the flowchart block(s). Computer program instructions may also be mounted on a computer or other programmable data processing equipment, such that a series of operating steps may be performed on the computer or other programmable data processing equipment to create a computer-implemented process to create a computer or other programmable data. Instructions for performing the processing equipment may also provide steps for performing the functions described in the flowchart block(s).

In addition, each block may represent a portion of a module, segment, or code that includes one or more executable instructions for executing a specified logical function(s). It should also be noted that in some alternative implementations, the functions noted in the blocks may occur out of order. For example, the two blocks shown in succession may in fact be executed substantially concurrently, or the blocks may sometimes be executed in the reverse order, depending on the corresponding function.

FIG. 1 is a schematic diagram illustrating a system for providing information according to an example embodiment.

According to various example embodiments, a system 100 for providing information includes an electronic apparatus 110 and a user terminal 120. According to an example embodiment, the system 100 for providing information may further include a network that supports information transmission and reception between at least some of the electronic apparatus 110, the user terminal 120, and other external apparatuses.

Each of the electronic apparatus 110 and the user terminal 120 may include a transceiver, a memory, and a processor. Further, each of the electronic apparatus 110 and the user terminal 120 is a unit that processes at least one function or operation, and such a unit may be implemented in hardware, software, or a combination of hardware and software. Meanwhile, throughout the example embodiments, each of the electronic apparatus 110 and the user terminal 120 is referred to as a separate apparatus or server, which may have a logically divided structure, and at least some thereof may be implemented by a function separated from one apparatus or server. In addition, throughout the example embodiments, when it is referred that the electronic apparatus 110 stores information, this means that the information is stored in the memory included in the electronic apparatus 110, but a location in which the information of the electronic apparatus 110 is stored is not necessarily limited to the internal memory of the electronic apparatus 110, and the information may be stored in a separate server or database physically separated from the electronic apparatus 110.

According to an example embodiment, the electronic apparatus 110 and the user terminal 120 may include a number of computer systems or computer software implemented in a network server. For example, at least some of the electronic apparatus 110 and the user terminal 120 may refer to a computer system and computer software that are connected to a sub-device capable of communicating with another network server over a computer network, such as an intranet or the Internet, to receive a request to perform an operation, performs the operation for the request, and provides a result of the operation. In addition, at least some of the electronic apparatus 110 and the user terminal 120 may be understood as a broad concept including a series of application programs that may be operated on a network server and various databases built inside or on other connected nodes. For example, at least some of the electronic apparatus 110 and the user terminal 120 may be implemented using a network server program that is variously provided according to operating systems such as DOS, Windows, Linux, Unix, or MacOS.

The electronic apparatus 110 is an apparatus that configures and provides various information. The electronic apparatus 110 may provide the configured information to a web page, an application screen, or the like or provide information in a form that may be displayed as a web page or an application screen in a terminal that receives the information.

The electronic apparatus 110 obtains input information of a user, wherein the input information is related to a service. The input information of the user includes information input to the user terminal 120, and the electronic apparatus 110 may obtain the input information from the user terminal 120.

The electronic apparatus 110 determines whether an account corresponding to the user exists in the service. According to an example embodiment, the electronic apparatus 110 may determine whether the account corresponding to the user exists based on information stored in the memory. According to an example embodiment, the electronic apparatus 110 may determine whether the account corresponding to the user exists by inquiring whether the account corresponding to the user exists in an external apparatus storing user account information. According to an example embodiment, the electronic apparatus 110 may also determine whether the account corresponding to the user exists based on whether the user is in a logged-in state.

The electronic apparatus 110 obtains characteristic information of the user based on the result of determining whether the account corresponding to the user exists. The characteristic information obtained by the electronic apparatus 110 may include one or more pieces of information for specifying the user, or may be obtained based on the one or more pieces of information for specifying the user.

The electronic apparatus 110 provides response information corresponding to the input information based on the characteristic information and the result of determining whether the account corresponding to the user exists. For example, when the account corresponding to the user does not exist while the characteristic information includes information specifying a user A, the electronic apparatus 110 may determine that the user who has inputted the input information is the user A, and may provide response information in consideration of a past activity history, personal information, or the like of the user A.

The electronic apparatus 110 obtains activity information of the user based on at least one of the input information, the response information, and the characteristic information. The activity information of the user may include an action performed by the user in relation to specific input information, information provided to the user, or the like.

The electronic apparatus 110 stores the activity information. The activity information may be stored in the memory of the electronic apparatus 110 and may be stored in the user terminal 120, an external apparatus, or the like.

More details related to the operation of the electronic apparatus 110 will be described below with reference to FIG. 2 and the like.

The user may include a subject configured to input information related to the service or the like provided by the electronic apparatus 110 and receive response information from the electronic apparatus 110 generated in response to the input. For example, the user may input inquiry information related to a particular page and receive answer information corresponding thereto. The user terminal 120 is a device operated and managed by the user, and may transmit the input information obtained from the user to the electronic apparatus 110, obtain response information corresponding to the input information from the electronic apparatus 110, and provide the response information to the user.

The electronic apparatus 110 and the user terminal 120 of the example embodiment may include a computer device, a mobile communication terminal, a server, and the like. The user terminal 120 may include an input device such as a touch pad, a mouse, a keyboard, or the like for receiving the user input, or may be connected to the input device. In addition, the user terminal 120 may include an output device such as a screen, a speaker, an interface device, or the like for providing information to the user, or may be connected to the output device. Furthermore, the input device and output device of the user terminal 120 may be integrally configured or interconnected, and for example, an interface for receiving the user input may be displayed on the user terminal 120.

Operations associated with a series of information processing methods according to various example embodiments may be implemented with a single physical device and may be implemented in a manner in which a plurality of physical devices are organically combined. For example, some of components included in the system 100 for providing information may be implemented with one physical device, and the other some thereof may be implemented with other physical devices. For example, any one physical device may be implemented as part of the electronic apparatus 110, and another physical device may be implemented as a part of the user terminal 120 or a part of another external apparatus. In some cases, each of the components included in the system 100 for providing information may be distributed and disposed in different physical devices, and the distributed components may be organically combined and configured to perform the functions and operations of the system 100 for providing information. For example, the electronic apparatus 110 of the present specification may include one or more sub-devices, and some operations described as being performed by the electronic apparatus 110 may be performed by a first sub-device, and another some operations may be performed by a second sub-device.

Figure 2:
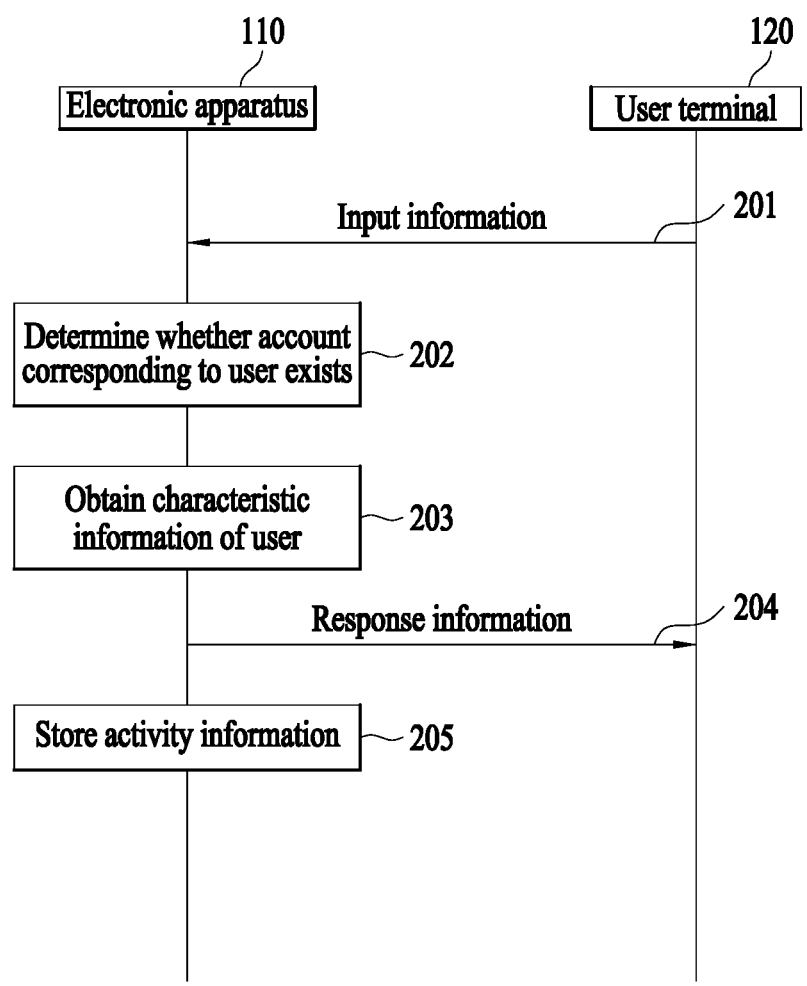
FIG. 2 is an operational flowchart illustrating a method of providing information by an electronic apparatus in the system for providing information according to an example embodiment.

FIG. 2 is an operational flowchart illustrating a method of providing information by the electronic apparatus in the system for providing information according to an example embodiment.

Referring to FIG. 2, in operation 201, the electronic apparatus 110 according to an example embodiment obtains input information of the user, wherein the input information is related to a service.

In operation 202, the electronic apparatus 110 determines whether an account corresponding to the user corresponding to the input information exists. When the user is in a logged-in state, the electronic apparatus 110 may determine an account used at log-in as the account corresponding to the user. On the other hand, when the user is not in a logged-in state, the electronic apparatus 110 may determine whether the account corresponding to the user exists based on one or more pieces of information for specifying the user. In this regard, the one or more pieces of information may include information related to the user terminal 120. For example, the one or more pieces of information may include at least one of a phone number corresponding to the user terminal 120, unique identifier information of the user terminal 120, and user information registered to correspond to the user terminal 120, and the electronic apparatus 110 may determine whether the account corresponding to the user exists by specifying a user corresponding to the input information based on the unique information or the like of the user terminal 120.

In operation 203, the electronic apparatus 110 obtains characteristic information of the user based on the result of determining whether the account corresponding to the user exists. The characteristic information obtained by the electronic apparatus 110 may include one or more pieces of information for specifying the user, or may be obtained based on one or more pieces of information for specifying the user.

Specifically, when the user is in a logged-in state, the electronic apparatus 110 may obtain the characteristic information based on account information used at log-in. On the other hand, when the user is not in a logged-in state, the electronic apparatus 110 may obtain the characteristic information based on one or more pieces of information for specifying the user, and in this case, the information for specifying the user may include at least some of the one or more pieces of information described in operation 202.

In operation 204, the electronic apparatus 110 provides response information corresponding to the input information based on the characteristic information and the result of determining whether the account corresponding to the user exists. The electronic apparatus 110 may obtain the characteristic information and activity history information of the user, which is specified according to whether the account corresponding to the user exists, and provide the response information based on the activity history information. For example, when the input information obtained by the electronic apparatus 110 includes a user query related to a service usage, the response information includes answer information for the user query, and the provided answer information may include whether the user has previously made the same or similar inquiry.

In addition, the electronic apparatus 110 may determine the response information to be provided to the user by determining whether to actually provide candidates of content, which may include the response information to be provided to the user, to the user based on the characteristic information. For example, when the response information includes the answer information for the user query, the electronic apparatus 110 may provide the response information by taking into account whether the candidate content, which may include the answer information, is useful to the user (e.g., when the user is a married man in his thirties, benefits for an unmarried adult woman may not be useful to the user) when personal information of the user indicated by the characteristic information is taken into consideration.

In operation 205, the electronic apparatus 110 stores activity information of the user based on at least one of the input information, the response information, and the characteristic information. According to an example embodiment, the electronic apparatus 110 may update the activity history information of the user to include activity information of the user. In this case, the activity history information may be information including a past activity history of the user. In this regard, the electronic apparatus 110 may not store the obtained activity information as separate independent information, instead of updating the activity history information of user to include the activity information of the user. Alternatively, the electronic apparatus 110 may update the activity history information of the user to include the activity information of the user while additionally storing the obtained activity information as separate independent information.

According to an example embodiment, the activity information may be obtained and stored based further on whether the account corresponding to the user exists. For example, when the account corresponding to the user exists, the activity information may include information of the corresponding account. Alternatively, by classifying a plurality of pieces of activity information according to whether the account corresponding to the user exists, non-member activity information (activity information of a user who does not have an account) and member activity information (activity information of a user who has an account) may be stored separately.

Descriptions related to storing the activity information based further on whether the account corresponding to the user exists will be provided below with reference to FIG. 4.

Figure 3:
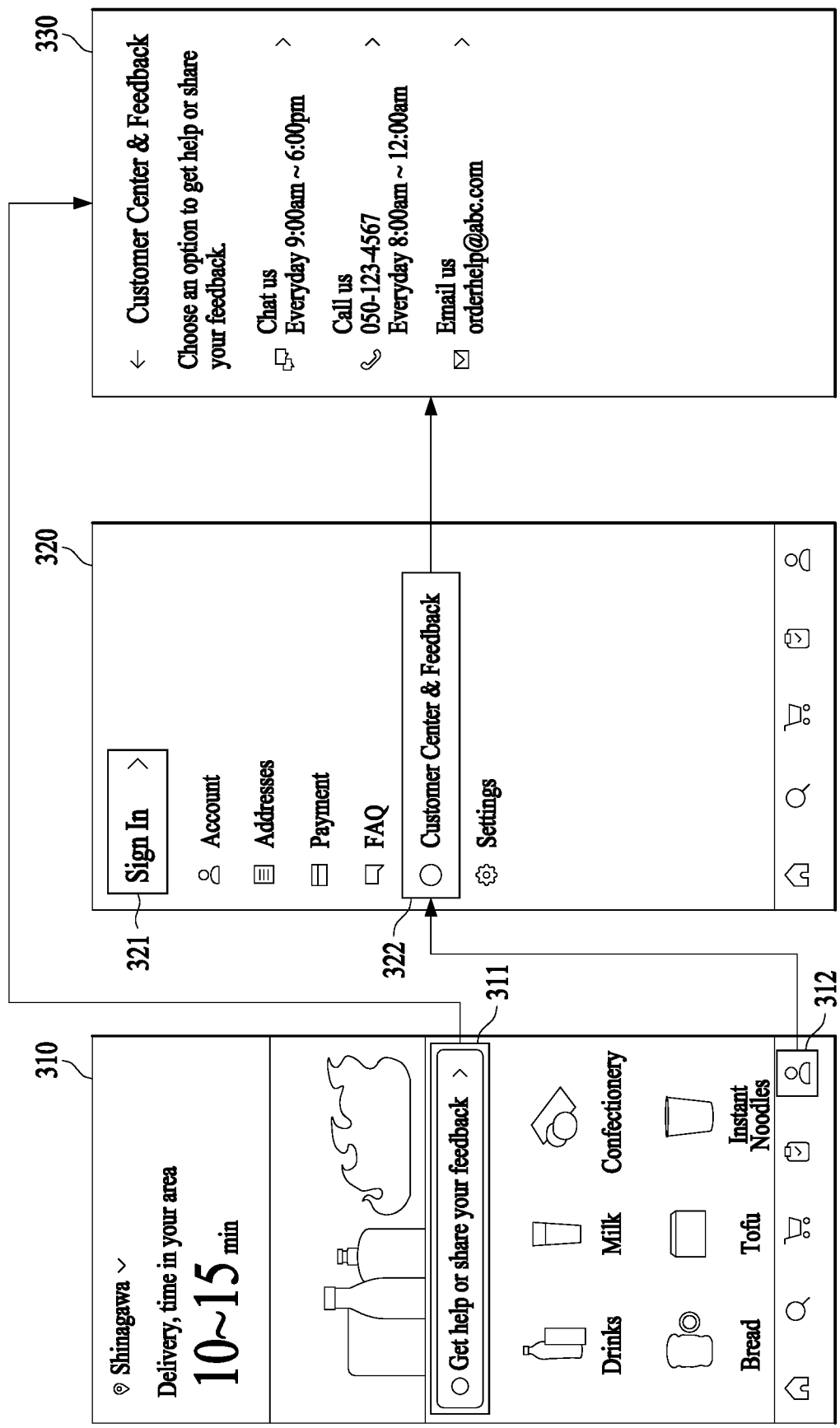
FIG. 3 is a view for illustratively describing a method of obtaining input information of a user according to an example embodiment.

FIG. 3 is a view for illustratively describing a method of obtaining input information of the user according to an example embodiment.

Referring to FIG. 3, in the user terminal 120, an interface 310 for receiving a user input may be displayed based on information provided from the electronic apparatus 110 according to an example embodiment. For example, the user terminal 120 may include an interface 311 including a guide message for receiving a help request and a feedback of the user, and an interface 312 for displaying a user profile.

When a user input for the interface 311 that includes the guide message is received, an interface 330, which includes specific means (a chat, a phone, an email, and the like) for receiving the help request and the feedback of the user, may be displayed in the user terminal 120. When a user input for the interface 312 for displaying the user profile is received, a user profile interface 320 may be displayed in the user terminal 120. In this regard, the user profile interface 320 includes an interface 322 for switching to a customer center, and as a user input for the interface 322 for switching to the customer is made, the interface 330 including specific means for receiving the help request and the feedback of the user may be displayed on the user terminal 120.

According to an example embodiment, the user profile interface 320 may be displayed on the user terminal 120 according to the user input for the interface 312 for displaying the user profile only when the user is in a logged-in state. In this case, in the case in which the user is not in a logged-in state, an interface for requesting log-in may be displayed in the user terminal 120 according to the user input for the interface 312 for displaying the user profile.

According to an example embodiment, even when the user is not in a logged-in state, the user profile interface 320 may be displayed in the user terminal 120 according to the user input for the interface 312 for displaying the user profile. In this case, an interface 321 for requesting sign-up or log-in may be displayed on the user profile interface 320 in place of profile summary information indicating the name or account information of the user.

As a user input for the interface 330, which includes specific means for receiving the help request and the feedback of the user, is additionally made, the help request and the feedback of the user according to the specific means may be received.

Figure 4:
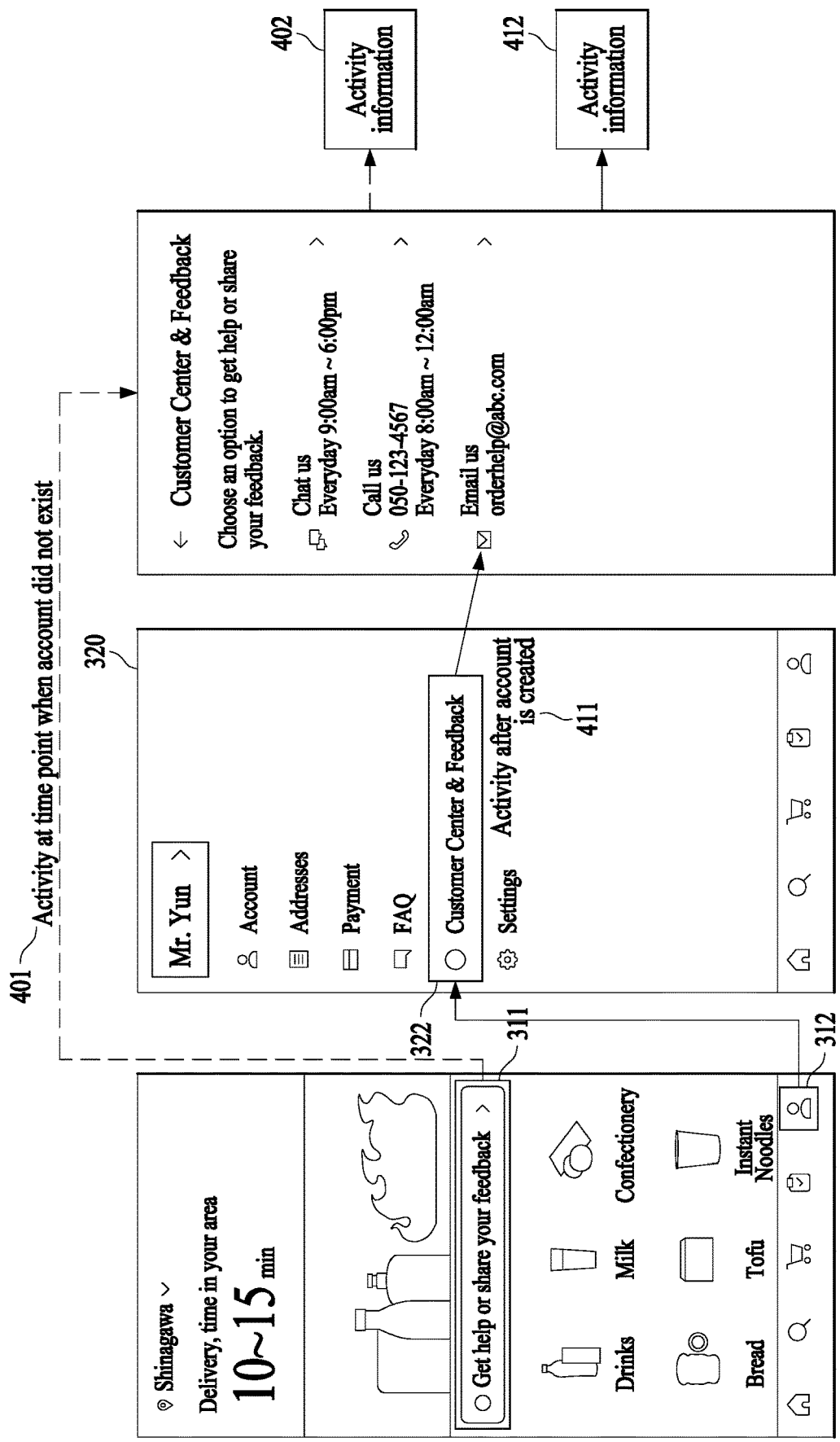
FIG. 4 is a view for illustratively describing a method of storing activity information of the user according to an example embodiment.

FIG. 4 is a view for illustratively describing a method of storing activity information of the user according to an example embodiment.

Referring to FIG. 4, the activity information of the user according to an example embodiment may include an action performed by the user in relation to specific input information or information provided to the user. For example, activity information corresponding to reference numeral 402 may include information indicating that a user input for the interface 311 including a guide message has been received from a user whose account does not exist, as indicated by reference numeral 401. In addition, activity information corresponding to reference numeral 412 may include information that displays the user profile interface 320 upon receipt of a user input for the interface 312 for displaying a user profile from a user whose account exists, and indicates that a user input for the interface 322 for switching to a customer center has been received, as indicated by reference numeral 411. That is, the activity information corresponding to reference numeral 402 may include information indicating that the activity of the activity information is an activity at a time point when the account of the user did not exist, or may include information indicating that the user's account does not exist. The activity information corresponding to reference numeral 412 may include information indicating that the activity of the activity information is an activity at a time point when the user's account existed, or may include information indicating that the user's account exists.

The electronic apparatus 110 may determine whether each activity has been made by the same user based on the characteristic information. For example, when a user performs an activity at a time point at which an account does not exist, and then further performs an activity after generating the account later, the electronic apparatus 110 may confirm that both activities have been performed by the same user based on the characteristic information corresponding to each piece of activity information. Further, depending on an example embodiment, a plurality of pieces of activity information, which are determined using the activities of the same user, may be managed as one group, or a single piece of activity information comprehensively including a plurality of activities of the same user may be generated. Alternatively, as described above, the activity information may be included in the activity history information of the user, and in this case, the plurality of pieces of activity information of the user may be managed as one group of activity history information.

Depending on an example embodiment, as the account information of the user is changed, a manner of storing the activity information may be changed or an attribute thereof may be changed. For example, as an account of the user is created later, the activity information, which was obtained when the account corresponding to the user did not exist, may be stored by being interlinked to the user account. Alternatively, the activity information that was obtained when the account corresponding to the user existed may be stored by releasing the linkage with the user account as the account of the user is deleted later. More specifically, when the electronic apparatus 110 receives an account creation request from the user, the electronic apparatus 110 may determine whether the user is allowed to create an account. The determination of whether the user is allowed to create an account may be made based on whether the account for the user exists, whether the number of accounts that may be created per person has been exceeded when the account exists, whether other reasons for disqualification for account creation exist, and the like. When it is determined that the user is allowed to create an account, the electronic apparatus 110 may provide an account creation page to the user terminal 120 in response to the account creation request. Furthermore, when an account corresponding to the user is created based on the user information input through the account creation page, the electronic apparatus 110 may change an attribute of the activity information based further on at least one of information associated with the created account and information associated with the process of the account creation. Specifically, the electronic apparatus 110 may interlink the activity information and the account corresponding to the user.

In addition, as the account of the user is deleted later, the activity information that was obtained when the account corresponding to the user has existed may be changed or the manner of storing the activity information may be changed. More specifically, when the electronic apparatus 110 receives an account deletion request from the user, the electronic apparatus 110 may determine whether the account for the user is allowed to be deleted. The determination of whether the account for the user is allowed to be deleted may be made based on whether the account for the user exists, whether an incomplete payment or settlement process in relation to the account exists, whether other reasons for disqualification for deleting an account exist, and the like. When it is determined that the account for the user is allowed to be deleted, the electronic apparatus 110 may provide an account deletion page to the user terminal 120 in response to the account deletion request. Furthermore, when the account corresponding to the user is deleted based on the user information input through the account deletion page, the electronic apparatus 110 may change the attribute of the activity information based further on at least one of information indicating that the account does not exist and information associated with the process of the account deletion. Specifically, the electronic apparatus 110 may release the link between the activity information and the account corresponding to the user. Meanwhile, in an example embodiment, when a user who does not have account information leaves an inquiry related to the service, the user who left the corresponding inquiry information may be identified based on an input of the user and terminal information used by the user. When the user, who uses corresponding identification information, creates an account for the service later, information related to the inquiry, which has been made without having the account before, may be determined in conjunction with the activity of the created account. To this end, it is confirmed whether the inquiry is an inquiry having information, which may identify the user, that matches the information that may identify the user obtained at the time of account creation, and when the inquiry is such an inquiry, the inquiry may be determined as an inquiry of the user who created the account, and the activity history may be determined as an activity history of the corresponding user.

According to an example embodiment, the electronic apparatus 110 may determine benefit information to be provided to the user based on the activity information of the user and the activity history information of the user. For example, the electronic apparatus 110 may determine that the user is interested in a sports field by referring to the activity information of the user and the activity history information of the user, and may provide the user with a customized discount coupon for a new product in the sports field.

FIG. 5 is a view for illustratively describing a method of providing response information according to an example embodiment.

Referring to FIG. 5, the electronic apparatus 110 according to an example embodiment may provide response information corresponding to the input information based on the characteristic information and the result of the determination. For example, the electronic apparatus 110 may receive a user input for the interface 311 that includes the guide message or a user input for the interface 322 for switching to the customer center, and accordingly, the electronic apparatus 110 may display the interface 330 including the specific means for receiving the help request and the feedback of the user in the user terminal 120, and upon receiving a user input designating a specific means, the electronic apparatus 110 may provide the response information. Specifically, referring to (a) of FIG. 5, the electronic apparatus 110 may receive a user input that selects a chat as the specific means for receiving the help request and the feedback of the user as in a block 501, and provide a chat screen for chat conversation with an agent in response thereto. In this regard, a greeting phrase 511 of the agent may include a user's name in the case in which an account corresponding to the user exists (e.g., "Hi, dear Mr. Yun."), and may not include the user's name in a case in which the account corresponding to the user does not exist (e.g., "Hi, dear customer.").

Further, referring to (b) of FIG. 5, the electronic apparatus 110 may receive a user input that selects a phone call as the specific means for receiving the help request and the feedback of the user as in a block 502, and provide a screen for connecting a call for conversation with the agent in response thereto. In this regard, a phone number 512, which may be connected to the agent, may be provided. According to an example embodiment, in the case in which an account corresponding to the user does not exist, when a phone call is connected according to the user input corresponding to the screen for connecting the phone call for a conversation with the agent, the electronic apparatus 110 may prevent a phone number of the user from being displayed to the agent.

Further, referring to (c) of FIG. 5, the electronic apparatus 110 may receive a user input that selects a mail as the specific means for receiving the help request and the feedback of the user as in a block 503, and provide a screen for transmitting a mail to the agent in response thereto. In this regard, customer information 513 for specifying the customer may be provided to the agent. Although the customer information 513 may include identifier information corresponding to each customer, the present disclosure is not limited thereto. According to an example embodiment, when an account corresponding to the user does not exist, the customer information for specifying the customer may not be provided to the agent, or customer information that is collectively assigned to an anonymous customer may be provided to the agent. For example, when an account corresponding to the user does not exist, the customer information 513 may include identifier information of "00000000" assigned collectively for the anonymous customer.

Here, even when the customer is anonymized in (a) to (c) so that the agent may not identify the customer, in order to determine whether different activities correspond to the activities performed by the same user, the activity information including the characteristic information may be obtained and stored.

Figure 6:
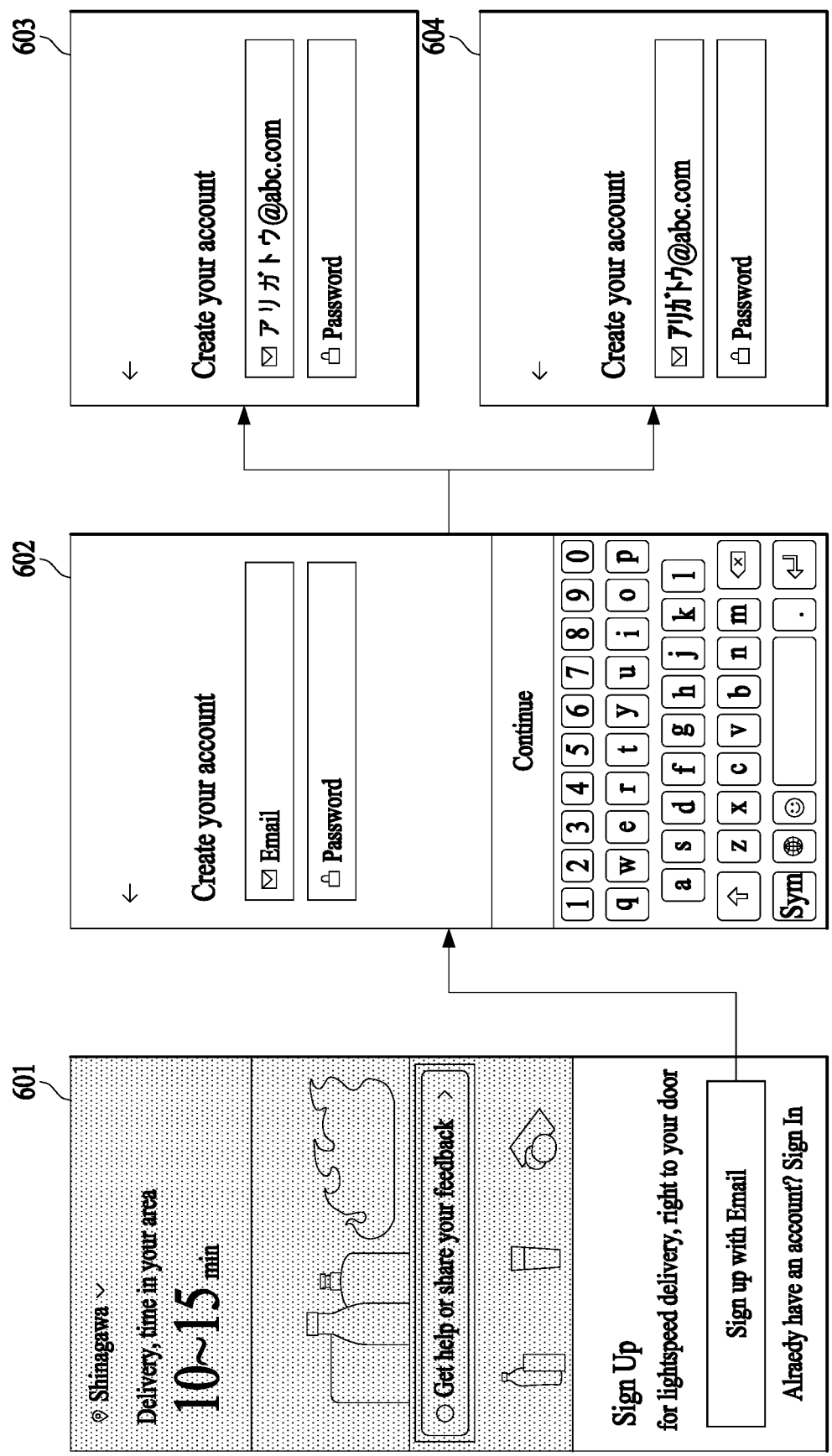
FIG. 6 is a view for describing a case in which one-byte characters included in information input by the user to create an account are converted into two-byte characters and processed, according to an example embodiment.

FIG. 6 is a view for describing a case in which one-byte characters included in information input by the user to create an account are converted into two-byte characters and processed, according to an example embodiment.

According to an example embodiment, one-byte characters included in the information input by the user to create an account are converted into two-byte characters and processed in the process of creating the user account. In an example 604 in which the user, who enters an account creation screen 602 from a screen 601, inputs an account identification (ID) in one-byte characters, the electronic apparatus 110 may process the user input in the same manner as in an example 603 in which the user inputs each character as the corresponding two-byte character. According to an example embodiment, when information input by the user includes a one-byte character, the one-byte character may be converted into a two-byte character and stored, and even when the user inputs a character that may be compared with the stored information, the input character may be converted into a two-byte character and compared with the stored information. In such a manner of inputting and converting, even when the user uses a mixture of two bytes and one-byte characters, it is possible to easily determine whether they are identical. When information converted into two-byte characters and stored is output, Hiragana, Katakana, and Chinese characters are displayed as two-byte characters, and numbers and English may be converted into one-byte characters and output.

Depending on an example embodiment, two-byte characters included in the information input by the user to create the account are converted into one-byte characters and processed in the process of creating the user account. Further, in addition to switching between two bytes and one-byte characters, characters displayed in a first language display system may be converted and processed in a second language display system to the extent that there is no error in the corresponding relationship. In this regard, the first language display system and the second language display system may be language display systems for displaying different languages, and may also be language display systems for displaying different languages in different ways.

In addition, depending on an example embodiment, in relation to various operations determined to be necessary for unification of the language display systems, in addition to the process of creating the account of the user, characters displayed by the first language display system may be converted into those displayed by the second language display system and processed.

As described above, by unifying and processing characters to appear as if they were displayed according to a specific method, the electronic apparatus 110 does not need to process data for inputting by each language display system according to a separate method, thereby saving resources and reducing overhead. Furthermore, upon receiving the input of the user, the input of the user is converted and processed according to one unified language display system, so that the probability of occurrence of errors may be reduced in relation to the operation of determining whether IDs are duplicated or the like.

Figure 7:
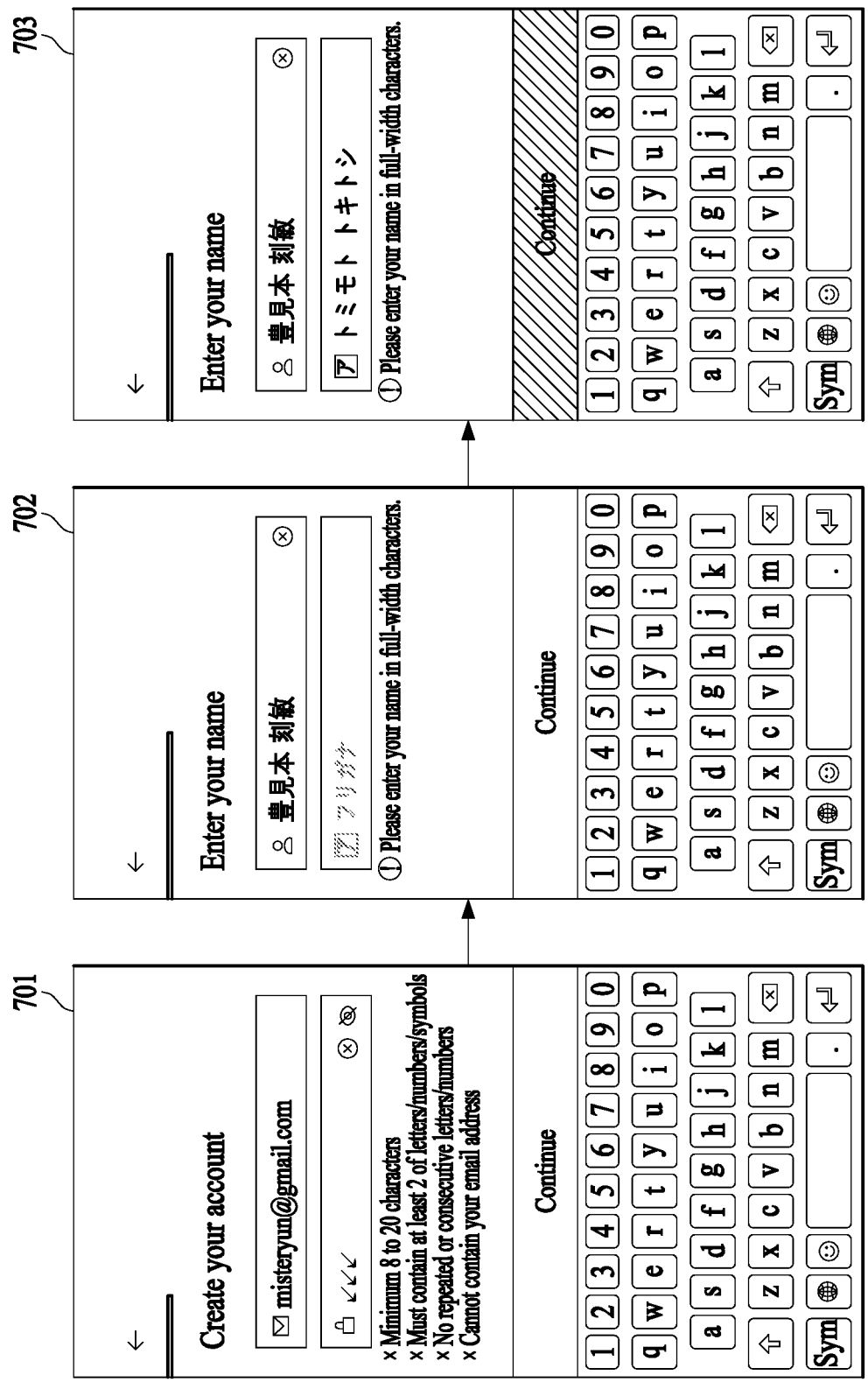
FIG. 7 is a view for describing a portion of an operation of providing a plurality of interfaces related to account creation of the user according to an example embodiment.

FIG. 7 is a view for describing a portion of an operation of providing a plurality of interfaces related to account creation of the user according to an example embodiment.

Referring to FIG. 7, the electronic apparatus 110 according to an example embodiment may sequentially provide a plurality of interfaces related to account creation so that the user inputs information for the account creation step by step. A plurality of information request interfaces may be sequentially provided to the user terminal 120 based on a user input.

In sequentially providing the plurality of interfaces related to the account creation by the electronic apparatus 110, the interfaces for input may be provided on a part of a display of the user terminal so that the user may input information for the account creation step by step, and hereinafter, this is referred to as a keyboard interface (here, this is for convenience of description, and an interface for input is not necessarily limited to a keyboard shape). Although a predetermined position of a part of the display to provide the keyboard interface may be a lower end part of a screen, the present disclosure is not necessarily limited thereto.

The keyboard interface may be provided such that a display state thereof is continuously maintained without being disappeared and displayed again whenever the plurality of interfaces associated with the account creation are sequentially provided. A seamless interface may be provided by allowing the keyboard to be provided while continuously maintaining the display state as described above.

For example, the electronic apparatus 110 may sequentially provide an interface (see 701) for requesting an input of an account ID/password(PW) to the user, an interface (see 702 and 703) for requesting an input of a name to the user, an interface requesting verification of a phone number (see 801 and 802 of FIG. 8) to the user, and an interface for requesting an input of agreement to service usage conditions to the user (see 803 of FIG. 8) to the user terminal 120.

In relation to a more specific operation of the electronic apparatus 110, the electronic apparatus 110 may receive an account ID and an account PW from the user based on the interface for requesting an input of the account ID/PW provided to the user terminal 120 as indicated by reference numeral 701.

The electronic apparatus 110, which has received the account ID and the account PW, may activate an interface for receiving a request to proceed to the next step. According to an example embodiment, the interface for receiving a request to proceed to the next step may include a user input for an interface "Continue" indicated in reference numeral 701.

The electronic apparatus 110, which has received the request to proceed to the next step from the user, may provide the user terminal 120 with an interface for requesting an input of a name, and may receive the name from the user based on the input, as indicated by reference numeral 701. In this regard, a method of providing the interface for requesting an input of a name may be determined based on a country to which the user belongs. The country to which the user belongs may be determined based on at least one of country information previously input from the user, language information set by the user in relation to the provision of services, and country information corresponding to a location of the user.

Based on the country to which the user belongs, details related to the input of the name may be determined. For example, in the case in which the country to which the user belongs is the United States, when the name input by the user includes two words, a first word may be understood as a first name and a second word may be understood as a second name. For example, in the case in which the country to which the user belongs is the United States, when the user has input the name "Chris Kim," it may be understood that Chris is a first name and Kim is a last name.

According to an example embodiment, in the case in which the country to which the user belongs is Japan, in order to clarify pronunciation for a name in Chinese characters, the interface for requesting an input of a name provided to the user terminal 120 may include an interface for additionally requesting an input of the pronunciation for the name. For example, the electronic apparatus 110 may receive a name like "豊見木 刻敞" from the user as indicated by reference numeral 702, and may receive pronunciation like "トミモトトキトシ" based on an interface that additionally requests the input of the pronunciation for the name as indicated by reference numeral 703. In this regard, the electronic apparatus 110 may request the user to input pronunciation for the name in Katakana, but is not necessarily limited thereto, and may receive the pronunciation in Hiragana or English.

The electronic apparatus 110, which has received necessary information in relation to the user's name, may activate an interface for receiving a request to proceed to the next step. According to an example embodiment, the interface for receiving a request to proceed to the next step may include a user input for an interface "Continue" illustrated in reference numeral 703.

The electronic apparatus 110 providing the interface for requesting the input of the name may activate an interface for receiving a request to proceed to the next step. In this regard, the request to proceed to the next step may include a user input for an interface "Continue" illustrated in reference numeral 703.

The electronic apparatus 110, which has received the request to proceed to the next step from the user, may provide an interface for requesting verification of a phone number to the user terminal 120, and based on this, the electronic apparatus 110 may perform the user's phone number verification, and more details related thereto will be described below with reference to FIGS. 8 and 9.

Figure 8:
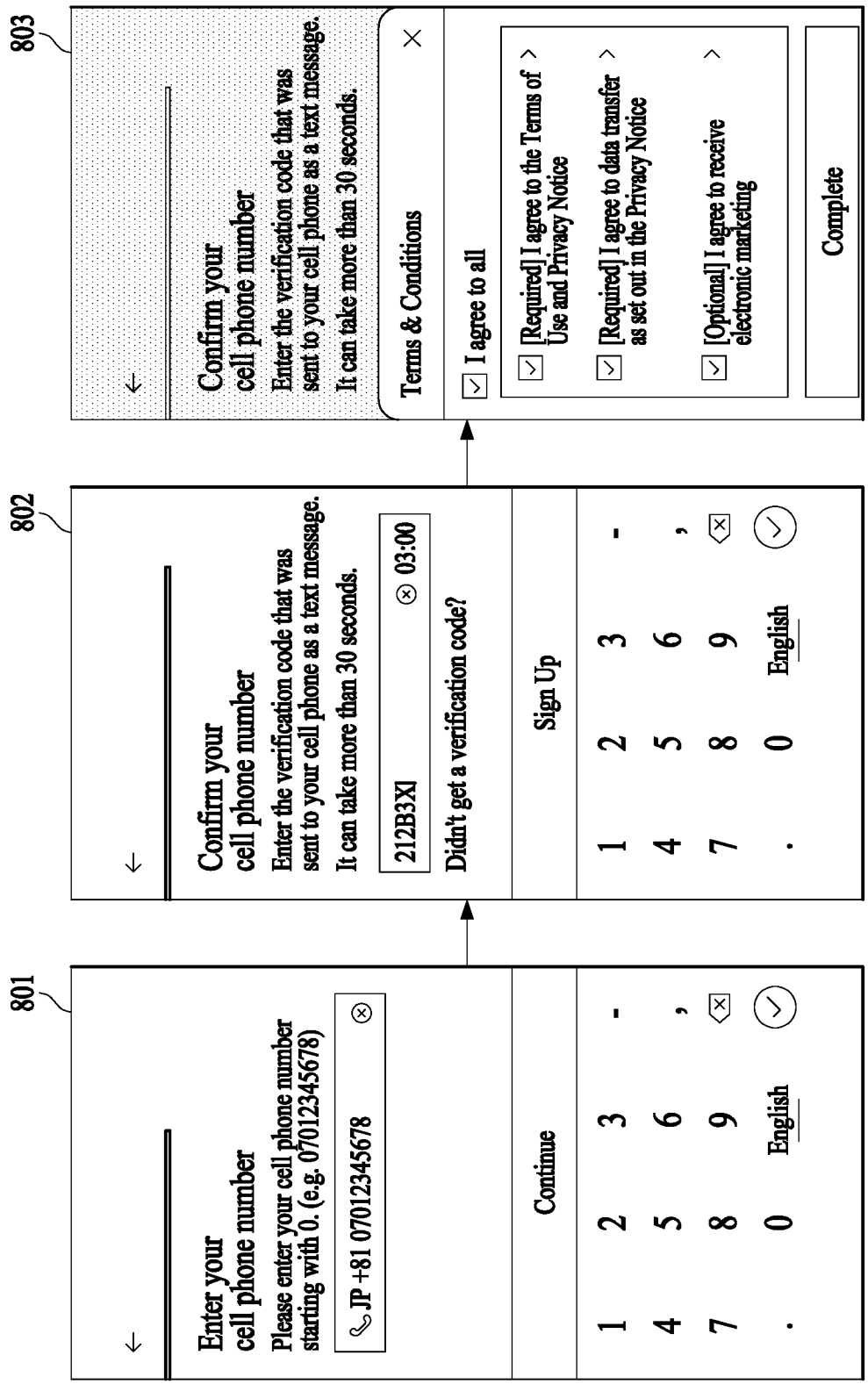
FIG. 8 is a view for describing a portion of the operation of providing the plurality of interfaces related to the account creation of the user according to an example embodiment.

FIG. 8 is a view for describing a portion of the operation of providing the plurality of interfaces related to the account creation of the user according to an example embodiment.

Referring to FIG. 8, the electronic apparatus 110 according to an example embodiment may perform a user's phone number verification. Depending on an example embodiment, in order to perform the user's phone number verification, instead of directly receiving a phone number from the user, the electronic apparatus 110 may identify a phone number of the terminal and transmit a code for verification to the corresponding phone number. In this case, the electronic apparatus 110 may directly provide an interface for receiving a code without providing an interface for receiving the phone number to the user terminal 120. However, in the following, for convenience of description, an example embodiment in which an interface for receiving a phone number is provided to the user terminal 120, and the verification is performed by receiving the phone number from the user.

The electronic apparatus 110 may automatically set a country code of the phone number based on the country to which the user belongs and provide the country code to the user terminal 120. For example, when the country to which the user belongs is Japan, the interface for requesting verification of the phone number provided to the user terminal 120 may be automatically set the country code as "+81," which is the country code of Japan. In this case, the user may perform the verification by inputting only its own unique phone number without inputting the country code to the interface requesting the verification of the phone number. However, even when the country code is automatically set, it does not mean that the user may not change the country code, the electronic apparatus 110 according to an example embodiment may further provide an interface for changing the country code.

According to an example embodiment, the interface for requesting verification of a phone number may include an interface for receiving a phone number from the user and an interface for receiving a code from the user. In this regard, the interface for receiving a phone number from the user and the interface for receiving a code from the user may be provided on one screen, and may be sequentially provided on separate screens.

According to an example embodiment, the electronic apparatus 110 may provide the interface for receiving a phone number from the user terminal 120, and receive the phone number from the user as indicated by reference numeral 801. In addition, the electronic apparatus 110, which has received the phone number, may activate an interface for receiving a request to proceed to the next step, and may be requested to proceed to the next step. In this case, the electronic apparatus 110 may transmit a code for the verification to the inputted phone number, provide an interface for receiving the code from the user terminal 120, and receive the code from the user as indicated by reference numeral 802.

More details related to receiving the code will be described below with reference to FIG. 9.

The electronic apparatus 110, which has received the code, may activate an interface for receiving a request to proceed to the next step, and may be requested to proceed to the next step. In this case, the interface for requesting to proceed to the next step may include a user input for an interface "Sign Up" indicated by reference numeral 802. In this regard, the interface indicated by the reference numeral 802 is an interface after receiving the information for the account creation from the user step by step, and thus a phrase "Sign Up" instead of "Continue" may be displayed, but the present disclosure is not necessarily limited thereto.

The electronic apparatus 110 requested to proceed to the next step may provide an interface for requesting an agreement input for service usage conditions as indicated by reference numeral 803. The interface for requesting the agreement input for the service usage conditions may be provided at a predetermined position. The predetermined position may be a lower end part of the screen, and in particular, may correspond to a position in which the keyboard interface is displayed in the interface for requesting an input of the name, the interface for requesting verification of a phone number, the interface for requesting an agreement input for the service usage conditions, and the like, but the present disclosure is not necessarily limited thereto.

According to an example embodiment, a method for providing the interface for requesting an agreement input for the service usage conditions may include a method of applying an animation effect that rises upward from a lower end of the screen.

By sequentially providing the plurality of interfaces related to account creation to the user, the user is less likely to omit or incorrectly inputs information for the account creation, and when the user omits or incorrectly inputs information for the account creation, the user may easily determine where the problem occurs, thereby improving the user's convenience in account creation.

Meanwhile, as described above, in the example embodiments, the interfaces for the information input in FIGS. 7 and 8 may be sequentially provided according to the user input, and when such interfaces are provided, the keyboard interface for input may be continuously provided at a portion of the display of the user terminal. Since the interfaces are continuously provided as described above, the user may continuously input information.

Further, as the plurality of interfaces are sequentially provided, the type of keyboard interface displayed at the predetermined position may vary. Specifically, the interface for input may be automatically changed and displayed to correspond to the characteristics of the information for input. For example, when a field for inputting information including only numbers is provided as in the interface for requesting verification of a phone number, which will be described later, the keyboard interface for input may also be changed to an interface for inputting numbers.

Figure 9:
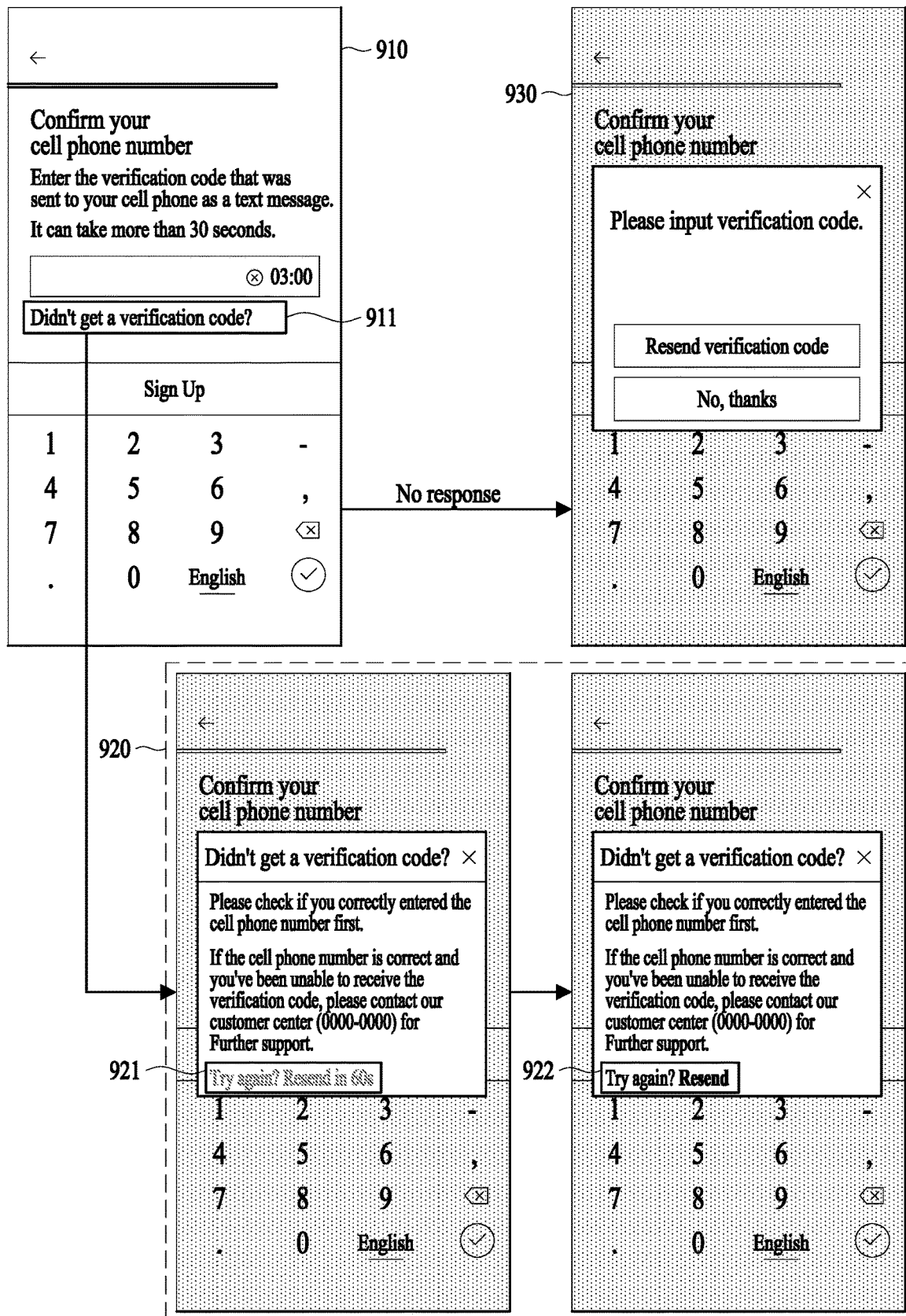
FIG. 9 is a view for illustratively describing a method of receiving an verification number according to an example embodiment.

FIG. 9 is a view for illustratively describing a method of receiving an verification number according to an example embodiment.

According to an example embodiment, referring to FIG. 9, the electronic apparatus 110, which has received the phone number, activates an interface for receiving a request to proceed to the next step, and may be requested to proceed to the next step. In this case, the electronic apparatus 110 may transmit a code for verification to the phone number (e.g., the input phone number) corresponding to the user, and provide an interface for receiving a code to the user terminal 120 as indicated by reference numeral 910.

The interface for receiving a code may further include an interface, as indicated by reference numeral 911, associated with non-receipt of the verification number (which is an example for a code for verification). The interface associated with the non-receipt of the verification number may include a phrase such as "Didn't get an verification number?" or "Didn't get an verification code?".

When an input for the interface associated with the non-receipt of the verification number is received from the user, the electronic apparatus 110 may provide a guide screen including at least one of a phrase requesting the user to reconfirm the phone number and a phrase including customer center information to which the customer may be contacted to solve the problem of receiving the code for verification. The guide screen may be provided in a pop-up form over the interface for receiving the code, or may be provided as a separate screen.

Further, the electronic apparatus 110 may further provide an interface for a retransmission request of the code for verification on the guide screen as indicated by reference numerals 921 and 922. In this regard, when a first preset time has not passed since the electronic apparatus 110 previously transmitted the code for verification to the phone number corresponding to the user, an interface for requesting retransmission of the code for verification may not be activated as indicated by reference numeral 921. In this case, the electronic apparatus 110 may provide information related to the remaining time until the first preset time passes in real time together with the information indicating that the interface for requesting retransmission of the code for verification may not be activated. For example, when the first preset time is 60 seconds, and 40 seconds have passed since the code for verification was sent to the phone number corresponding to the user, the information provided by the electronic apparatus 110 may include a phrase like "Try again? Resend in 20 s."

In this regard, the first preset time, which is a criterion for whether to request retransmission of the code for verification, may be determined in consideration of a communication service situation of a country to which the user belongs. For example, when the country to which the user belongs is Japan, and 99.9% of letters transmitted in Japan are sent and received within 60 seconds, the first preset time, which is a criterion for whether to request retransmission of the code for verification, may be determined to be 60 seconds in the case in which the country to which the user belongs is Japan. Depending on an example embodiment, the first preset time, which is a criterion for whether to request retransmission of the code for verification, may be determined by further considering a communication service situation in a local area to which the user belongs, a type of communication service subscribed by the user, and the like in addition to the communication service situation in the country to which the user belongs.

When the first preset time has passed since the code for verification was previously transmitted to the phone number corresponding to the user, the electronic apparatus 110 may activate the interface for requesting retransmission of the code for verification as indicated by reference numeral 922. In addition, when an input for the interface for requesting retransmission of the code for verification is received from the user, the electronic apparatus 110 may retransmit the code for verification.

According to an example embodiment, when there is no response from the user for a second preset time after the code for verification is transmitted to the phone number corresponding to the user by the electronic apparatus 110, and the interface for receiving is provided to the user terminal 120 as indicated by reference numeral 910, the electronic apparatus 110 may further provide a screen for requesting a response of the user as indicated by reference numeral 930. In this regard, the second time may be set to be longer than the first time.

Meanwhile, in the example embodiment, the second time may be set to correspond to an effective time of the code for verification. According to an example embodiment, after the user requests the code for verification and before a valid time passes, the user should input the code, and when the valid time has passed, the verification may not be performed even when the user inputs the received code. Thus, when the valid time of the code for verification has passed, the user terminal 120 may provide information suggesting retransmission of the code for verification to the user, thereby allowing the user to receive a new verification code.

Whether there was a response from the user may include whether there was any response from the user for the screen related to the service, whether any verification number has been received from the user, and whether the correct verification number has been input by the user.

The screen for requesting the response of the user may include at least one of information (e.g., Please confirm your cell phone number) requesting the user to confirm the phone number and information (e.g., Please input verification code) requesting an input of a received code. The guide screen may be provided in a pop-up form over the interface for receiving the code, or may be provided as a separate screen. Further, according to an example embodiment, the screen for requesting the response of the user may further include at least one of an interface for receiving an input of a request for retransmission of the code for verification by the user and an interface for receiving a rejection input for requesting the code for verification from the user.

Figure 10:
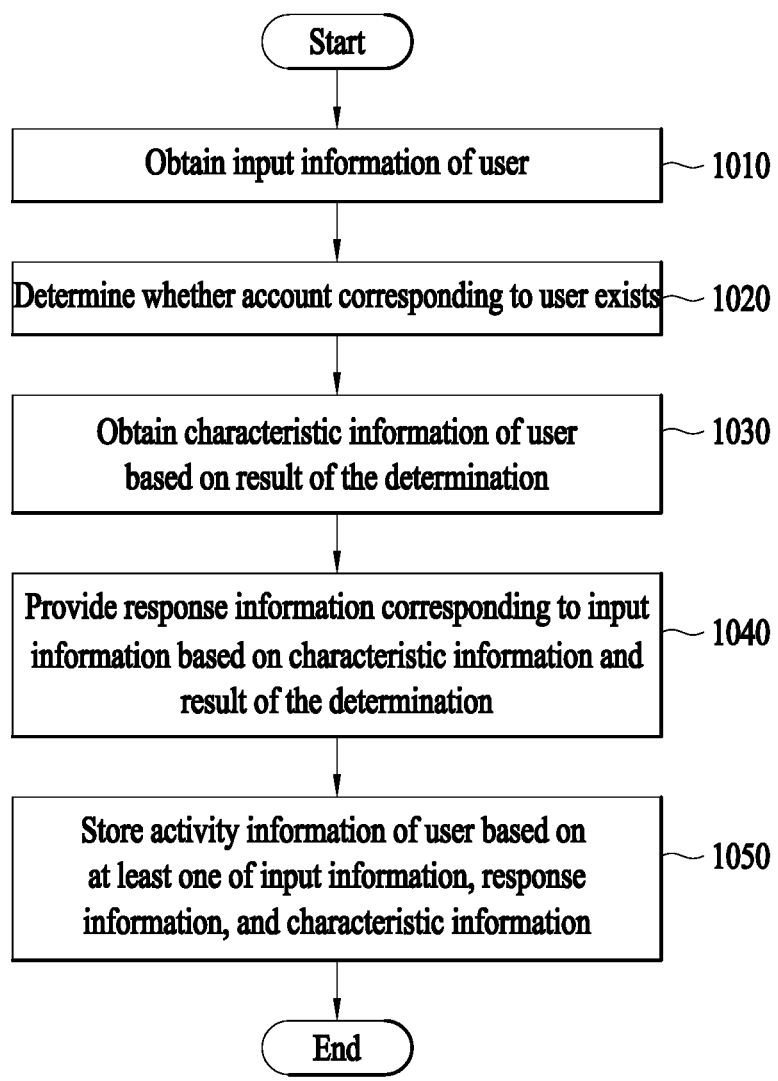
FIG. 10 is an operational flowchart of a method of providing information by the electronic apparatus according to an example embodiment.

FIG. 10 is an operational flowchart of a method of providing information by the electronic apparatus according to an example embodiment.

Referring to FIG. 10, the electronic apparatus 110 according to an example embodiment obtains input information of the user in operation 1010, wherein the input information is related to a service, and determines whether an account corresponding to the user corresponding to the input information exists in the service in operation 1020. When the user is in a logged-in state, the electronic apparatus 110 may determine that the account used in the logged-in is an account corresponding to the user. On the other hand, when the user is not in a logged-in state, the electronic apparatus 110 may determine whether the account corresponding to the user exists based on one or more pieces of information for specifying the user.

In operation 1030, based on the result of determining whether the account corresponding to the user exists, the electronic apparatus 110 obtains characteristic information of the user. The characteristic information obtained by the electronic apparatus 110 may include one or more pieces of information for specifying the user, or may be obtained based on one or more pieces of information for specifying the user.

In operation 1040, the electronic apparatus 110 provides response information corresponding to the input information based on the characteristic information and the result of determining whether the account corresponding to the user exists. The response information includes answer information for a user query, and the provided answer information may include whether the user has previously made the same or similar inquiry.

In operation 1050, the electronic apparatus 110 stores activity information of the user based on at least one of the input information, the response information, and the characteristic information.

Figure 11:
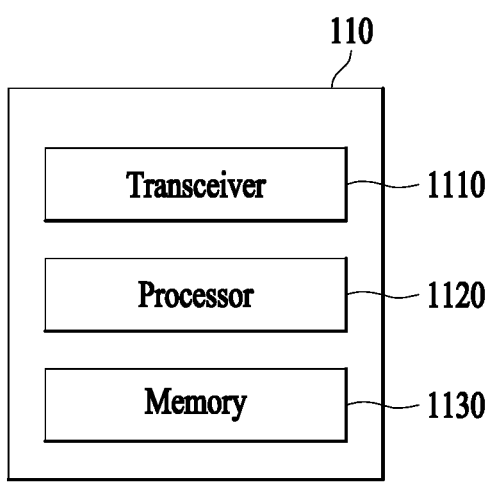
FIG. 11 is an exemplary view of a configuration of the electronic apparatus for providing delivery information according to an example embodiment.

FIG. 11 is an exemplary view of a configuration of the electronic apparatus for providing delivery information according to an example embodiment.

Referring to FIG. 11, the electronic apparatus 110 includes a transceiver 1110, a processor 1120, and a memory 1130. The electronic apparatus 110 may be connected to the user terminal 120, other external apparatuses, and the like through the transceiver 1110, and may exchange data therewith.

The processor 1120 may include one or more devices described above with reference to FIGS. 1 to 10, or may perform the at least one method described above with reference to FIGS. 1 to 10. The memory 1130 may store information for performing the at least one method described above with reference to FIGS. 1 to 10. The memory 1130 may be a volatile memory or a non-volatile memory.

The processor 1120 may execute a program and control the electronic apparatus 110 configured to provide information. Codes of the program executed by the processor 1120 may be stored in the memory 1130.

In addition, the electronic apparatus 110 of an example embodiment may further include an interface that provides information to the user.

Meanwhile, while the example embodiments of the present disclosure have been disclosed and specific terms have been used in the present specification and the drawings, these example embodiments are provided merely to facilitate the technical contents of the present disclosure and to promote understanding of the present disclosure, and the scope of the present disclosure is not limited to these example embodiments in any sense. It is clear to those skilled in the art to which the present disclosure pertains that other modifications based on the technical spirit of the present disclosure may be made in addition to the example embodiments disclosed herein.

According to the example embodiments described above, the electronic apparatus or the terminal may include a processor, a memory for storing and executing program data, a permanent storage such as a disk drive, a communication port for communicating with external devices, and user interface devices, such as a touch panel, keys, buttons, and the like. Methods may be implemented with software modules or algorithms and may be stored as program instructions or computer-readable codes executable on a processor on a computer-readable recording medium. Examples of the computer-readable recording medium include magnetic storage media (e.g., read-only memory (ROM), random-access memory (RAM), floppy disks, hard disks, and the like), optical recording media (e.g., CD-ROMs, or digital versatile discs (DVDs)), and the like. The computer-readable recording medium may also be distributed over network coupled computer systems so that the computer-readable codes are stored and executed in a distributive manner. The media may be readable by the computer, stored in the memory, and executed by the processor.

The present example embodiments may be described in terms of functional block components and various processing operations. Such functional blocks may be implemented by any number of hardware and/or software components configured to perform the specified functions. For example, these example embodiments may employ various integrated circuit (IC) components, e.g., memory elements, processing elements, logic elements, look-up tables, and the like, which may perform various functions under the control of one or more microprocessors or other control devices. Similarly, where components are implemented using software programming or software components, the present example embodiments may be implemented with any programming or scripting language including C, C++, Java, assembler, Python, or the like, with the various algorithms being implemented with any combination of data structures, processes, routines or other programming components. Functional aspects may be implemented in algorithms that are executed on one or more processors. In addition, the present example embodiments may employ conventional techniques for electronics environment setting, signal processing and/or data processing and the like. The terms "mechanism," "element," "means," "configuration," and the like may be used in a broad sense and are not limited to mechanical or physical components. The term may include the meaning of a series of routines of software in conjunction with a processor or the like.

The above-described example embodiments are merely examples and other example embodiments may be implemented within the scope of the following claims.

What is claimed is:

1. A method of providing information by an electronic apparatus, the method comprising:
   obtaining input information of a user, wherein the input information is related to a service;
   determining whether an account corresponding to the user exists in the service;
   based on determining that the account corresponding to the user does not exist, obtaining characteristic information of the user based on terminal information of the user;
   providing response information corresponding to the input information based on the characteristic information;
   storing activity information of the user based on at least one of the input information, the response information, and the characteristic information;
   linking, based on the account corresponding to the user is created, the activity information to the account corresponding to the user;
   receiving an account deletion request of the user;
   providing an account deletion page in response to the account deletion request based on an account for the user is allowed to be deleted; and
   releasing a link between the activity information and the account corresponding to the user after the account corresponding to the user is deleted, wherein the deletion of the account corresponding to the user is based on user information input through the account deletion page.

2. The method of claim 1, wherein the determining of whether the account exists comprises:
   determining, based on the user being in a logged-in state, an account used in logged-in as the account corresponding to the user; and
   determining, when the user is not in a logged-in state, whether the account corresponding to the user exists based on one or more pieces of information for specifying the user.

3. The method of claim 2, wherein the one or more pieces of information includes information related to a terminal used by the user.

4. The method of claim 3, wherein the information related to the terminal includes at least one of:
   a phone number corresponding to the terminal;
   unique identifier information of the terminal; and
   user information registered to correspond to the terminal.

5. The method of claim 2, wherein the obtaining of the characteristic information comprises:
   obtaining the characteristic information based on account information used in the logged-in when the user is in a logged-in state; and
   obtaining the characteristic information based on at least one of the one or more pieces of information, when the user is not in a logged-in state.

6. The method of claim 1, wherein the providing of the response information comprises:
   obtaining activity history information of the user based on the characteristic information of the user; and
   providing the response information based on the activity history information.

7. The method of claim 1, wherein the storing of the activity information of the user comprises updating activity history information of the user to include the activity information of the user.

8. The method of claim 1, further comprising:
   receiving an account creation request of the user;
   providing, based on the account creation request, an account creation page configured to be displayed to the user for which an account is to be created; and
   creating the account corresponding to the user based on the user information input through the account creation page.

9. The method of claim 8, wherein a one-byte character included in the information input by the user to create the account is converted into a two-byte character and processed in the process of creating the account of the user.

10. The method of claim 8, wherein the providing of the account creation page comprises:
    transmitting a code for verification to a phone number corresponding to the user;
    receiving an input from the user; and
    verifying whether the input corresponds to the code for the verification.

11. The method of claim 8, further comprising:
    receiving an input related to non-receipt of a code for verification from the user;
    providing information indicating that an interface for requesting retransmission of a code for verification is not activated when a first preset time has not passed since the code for verification was previously transmitted to a phone number corresponding to the user; and
activating the interface for requesting retransmission of a code for verification when the first preset time has passed since the code for verification was previously transmitted to the phone number corresponding to the user.

12. The method of claim 11, wherein the first preset time is determined based on a communication service situation of a country to which the user belongs.

13. The method of claim 1, further comprising:
providing a screen for requesting a response of the user when based upon no response received from the user for a second preset time,
wherein the screen for requesting a response of the user includes at least one of information for requesting confirmation of a phone number and information for requesting an input of a received code.

14. The method of claim 1, further comprising:
determining benefit information provided to the user based on the activity information of the user and activity history information of the user.

15. A non-transitory computer-readable recording medium comprising a computer program to execute the method of claim 1.

16. An electronic apparatus for providing information, the electronic apparatus comprising:
a transceiver;
a memory configured to store instructions; and
a processor,
wherein the processor is connected to the transceiver and the memory, and configured to:
  obtain input information of a user, wherein the input information is related to a service;
  determine whether an account corresponding to a user exists in the service;
  based on determination that the account corresponding to the user does not exist,
obtain characteristic information of the user based on terminal information of the user;
  provide response information corresponding to the input information based on the characteristic information;
  store activity information of the user based on at least one of the input information, the response information, and the characteristic information;
  link, based on the account corresponding to the user is created, the activity information to the account corresponding to the user;
  the activity information is stored in the memory;
  receive an account deletion request of the user;
  provide an account deletion page in response to the account deletion request based on an account for the user is allowed to be deleted; and
  release a link between the activity information and the account corresponding to the user after the account corresponding to the user is deleted, wherein the deletion of the account corresponding to the user is based on user information input through the account deletion page.

* * * * *